(12) United States Patent
Haller (10) Patent No.: US 8,366,195 B2
(45) Date of Patent: Feb. 5, 2013

(54) VEHICLE SEAT WITH A BASE FRAME AND A SEAT FRAME MOVEABLE RELATIVE TO THAT BASE FRAME

(75) Inventor: Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 237 days.

(21) Appl. No.: 12/172,081

(22) Filed: Jul. 11, 2008

(65) Prior Publication Data

US 2009/0026816 A1 Jan. 29, 2009

(30) Foreign Application Priority Data

Jul. 14, 2007 (DE) .................. 10 2007 032 897

(51) Int. Cl.
*A47C 31/00* (2006.01)
(52) U.S. Cl. ................ 297/344.12; 296/65.01; 248/157; 267/131
(58) Field of Classification Search ............... 296/65.01; 297/344.12; 248/157; 267/131
See application file for complete search history.

(56) References Cited

U.S. PATENT DOCUMENTS

| | | | |
|---|---|---|---|
| 2,973,968 A | 3/1961 | Behles | |
| 3,042,392 A | 7/1962 | Schmitz et al. | |
| 3,466,055 A | 9/1969 | Keijzer | |
| 3,552,763 A | 1/1971 | Yasin | |
| 3,762,769 A | 10/1973 | Poschl | |
| 3,966,223 A | 6/1976 | Carr | |
| 4,052,088 A | 10/1977 | Nicholls | |
| 4,159,105 A | 6/1979 | Vander Laan et al. | |
| 4,193,629 A | 3/1980 | Merkle | |
| 4,286,765 A | 9/1981 | Delgleize et al. | |
| 4,418,955 A | 12/1983 | Muncke et al. | |
| 4,451,079 A | 5/1984 | Takahashi | |
| 4,463,839 A | 8/1984 | Ashiba | |
| 4,600,215 A | 7/1986 | Kuroki et al. | |
| 4,634,142 A | 1/1987 | Woods et al. | |
| 4,645,042 A | 2/1987 | Inoue et al. | |
| 4,645,169 A | 2/1987 | Mischer | |
| 4,684,100 A | 8/1987 | Grassl | |
| 4,700,971 A | 10/1987 | Doi et al. | |
| 4,726,604 A | 2/1988 | Asami et al. | |
| 4,729,539 A | 3/1988 | Nagata | |
| 4,729,580 A | 3/1988 | Buma et al. | |
| 4,733,847 A | 3/1988 | Grassl | |
| 4,822,094 A | 4/1989 | Oldfather et al. | |
| 4,852,863 A | 8/1989 | Breitenbacher et al. | |
| 4,946,145 A | 8/1990 | Kurabe | |
| 5,058,852 A | 10/1991 | Meier et al. | |
| 5,125,631 A | 6/1992 | Brodersen et al. | |
| 5,133,575 A | 7/1992 | Zantinge et al. | |

(Continued)

FOREIGN PATENT DOCUMENTS

| DE | 220674 | 4/1985 |
|---|---|---|
| DE | 223835 | 6/1985 |

(Continued)

*Primary Examiner* — Joseph Pape
(74) *Attorney, Agent, or Firm* — Lowe Graham Jones PLLC (57) ABSTRACT

The invention relates to a vehicle seat comprising a base frame and comprising a seat frame which can be adjusted relative to the base frame, and comprising a gas spring which acts between this base frame and this seat frame and which is supported against the seat frame, wherein at least one pressure source and at least one valve device which is in fluid connection with this pressure source are provided, and in that furthermore a manually operated actuation element is provided for adjusting the vehicle seat, wherein this at least one valve device is arranged on or in the actuation element.

4 Claims, 7 Drawing Sheets

U.S. PATENT DOCUMENTS

| | | |
|---|---|---|
| 5,169,129 A | 12/1992 | Hoffman |
| 5,176,355 A | 1/1993 | Carter |
| 5,217,210 A | 6/1993 | Schützner |
| 5,255,935 A | 10/1993 | Imani |
| 5,324,069 A | 6/1994 | Ogawa |
| 5,413,316 A | 5/1995 | Easter |
| 5,425,436 A | 6/1995 | Teramura et al. |
| 5,428,533 A | 6/1995 | Ogawa |
| 5,450,322 A | 9/1995 | Tanaka et al. |
| 5,533,703 A | 7/1996 | Grassl et al. |
| 5,536,059 A | 7/1996 | Amirouche |
| 5,555,501 A | 9/1996 | Furihata et al. |
| 5,558,398 A | 9/1996 | Santos |
| 5,603,387 A | 2/1997 | Beard et al. |
| 5,623,410 A | 4/1997 | Furihata et al. |
| 5,735,509 A | 4/1998 | Gryp et al. |
| 5,941,920 A | 8/1999 | Schubert |
| 6,000,703 A | 12/1999 | Schubert et al. |
| 6,029,764 A | 2/2000 | Schubert |
| 6,067,491 A | 5/2000 | Takahashi |
| 6,078,791 A | 6/2000 | Tuttle et al. |
| 6,082,715 A | 7/2000 | Vandermolen |
| 6,314,353 B1 | 11/2001 | Ohsaku et al. |
| 6,371,456 B1 | 4/2002 | Ritchie et al. |
| 6,490,930 B1 | 12/2002 | Ohkubo et al. |
| 6,616,116 B1 | 9/2003 | Rochau et al. |
| 7,152,839 B2 | 12/2006 | Mullinix et al. |
| 7,712,836 B2 | 5/2010 | Deml |
| 2001/0044685 A1 | 11/2001 | Schubert |
| 2003/0015830 A1 | 1/2003 | Miller et al. |
| 2003/0140487 A1 | 7/2003 | Plettner |
| 2004/0094912 A1 | 5/2004 | Niwa et al. |
| 2006/0185434 A1 | 8/2006 | Bernhagen |
| 2007/0236071 A1 | 10/2007 | Fujita et al. |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0272871 A1 | 11/2009 | Haller |
| 2010/0102493 A1 | 4/2010 | Deml et al. |
| 2010/0117428 A1 | 5/2010 | Deml et al. |

FOREIGN PATENT DOCUMENTS

| | | |
|---|---|---|
| DE | 3517503 | 11/1986 |
| DE | 3717703 | 12/1988 |
| DE | 4025183 | 11/1991 |
| DE | 4211628 | 10/1993 |
| DE | 4335199 | 5/1995 |
| DE | 19803750 | 8/1998 |
| DE | 19714576 | 10/1998 |
| DE | 19902224 | 4/2000 |
| DE | 19848821 | 5/2000 |
| DE | 20214583 | 1/2003 |
| DE | 10317134 | 6/2004 |
| DE | 10330198 | 2/2005 |
| DE | 102004054325 | 4/2006 |
| DE | 102005023090 | 11/2006 |
| DE | 102005043575 | 3/2007 |
| DE | 102005044214 | 3/2007 |
| EP | 0089794 | 9/1983 |
| EP | 0563948 | 4/1993 |
| EP | 0938999 | 9/1999 |
| EP | 1050749 | 11/2000 |
| EP | 1188608 | 3/2002 |
| EP | 1352595 | 10/2003 |
| EP | 1464866 | 10/2004 |
| EP | 1484205 | 12/2004 |
| EP | 1657471 | 5/2006 |
| EP | 1693655 | 8/2006 |
| EP | 1844979 | 10/2007 |
| FR | 2879740 | 6/2006 |
| JP | 61075008 | 4/1986 |
| JP | 2133215 | 5/1990 |
| JP | 2197470 | 8/1990 |
| JP | 3200485 | 9/1991 |
| JP | 2004058695 | 2/2004 |
| JP | 2004185476 | 7/2004 |
| KR | 20020090377 | 12/2002 |
| WO | 8703256 | 6/1987 |
| WO | 8809270 | 12/1988 |
| WO | 8912766 | 12/1989 |
| WO | 0035708 | 6/2000 |
| WO | 0043952 | 7/2000 |
| WO | 0058125 | 10/2000 |
| WO | 02068229 | 9/2002 |
| WO | 2004057528 | 7/2004 |
| WO | 2005008578 | 1/2005 |
| WO | 2005022690 | 3/2005 |
| WO | 2005095153 | 10/2005 |
| WO | 2005102112 | 11/2005 |

VEHICLE SEAT WITH A BASE FRAME AND A SEAT FRAME MOVEABLE RELATIVE TO THAT BASE FRAME

PRIORITY CLAIM

This application claims priority to German Patent Application Serial No. 10 2007 032 897.6, filed Jul. 14, 2007, which application is hereby incorporated by reference in its entirety as if fully set forth herein.

The invention relates to a vehicle seat comprising a base frame and a seat frame which can be moved or adjusted relative to this base frame, and comprising a gas spring which acts between this base frame and this seat frame and which is supported against the seat frame.

There is already known from DE 40 25 183 C1 a vehicle seat which comprises a base frame and a seat frame, wherein the base frame and the seat frame are connected via a scissors-type framework. In the embodiment proposed therein, there is also a gas spring arranged between the seat frame and the base frame, and also a valve device which can be operated by means of an actuation element in order to adjust the pressure in the gas spring as a function of the weight of the driver. Also provided therein is a so-called weight adjustment possibility or a corresponding device for weight-dependent adjustment. Also provided in the embodiment is a device for adjusting the desired seat height (height adjustment). Provided between the seat frame and the base frame is a belt reel-in device with a coupling which, in the same way as the gas spring, can be acted upon by compressed gas by means of a pressure source. The valve device in said document comprises a 3/2-way valve and a 2/2-way valve. These two directional valves, along with a microswitch, are arranged on a carrier member, wherein the directional valves and the microswitch form part of a control device. Two cables are provided on the carrier member. These two cables are in each case coupled to a manually operated switch, which is designed here in particular as a pivoting lever, so that an adjustment or pivoting of the switch triggers a corresponding pivoting of the carrier member. In the embodiment known from DE 40 25 183 C1, there is also a belt reel-in device (already mentioned) which is provided with a coupling and is arranged on the seat frame. This belt reel-in device comprises a belt which at one end is fixed to this belt reel-in device and at the other end is fixed to the base frame. Also provided are one or two cam plates which are arranged on the belt reel-in device. Via sensors, the 2/2-way valve and/or the microswitch can be actuated by the cam plate or vice versa. If a pivoting of the carrier member is brought about by means of the manual actuation element via the cables, an adjustment of the 2/2-way valve and/or of the microswitch is brought about by the cooperation of the sensing pins with the cam plate—depending on the actuation. Also provided is a compressor which can be driven by a motor and is fluidically connected to the gas spring. The coupling (already mentioned) of the belt reel-in device can be acted upon by compressed gas by means of the 3/2-way valve for actuation purposes.

If the seat is to be adjusted in terms of its height (in the upward direction), i.e. the seat frame is to be raised with respect to the base frame, then a manually operated actuation element is pulled upwards. The actuation element can be pivoted about an axle so that, when the actuation element is pulled upwards, one cable is pulled out of a sleeve. As a result, the cable is moved in such a way that the control device is pivoted about a pivot axle in such a way that the microswitch is actuated or closed by means of the cam plate via the sensing element. In this closed position of the microswitch, current is supplied to the drive motor so that the compressor is actuated accordingly by means of the drive motor. As a result, the gas spring is acted upon by compressed gas by means of the compressor forming a pressure source, so that the seat frame is raised accordingly.

If the seat frame is to be lowered with respect to the base frame, the actuation element is pushed downwards, namely by pivoting about an appropriate axle. As a result, the second cable is lengthened with respect to its cable sleeve. This in turn causes an actuation of the control device by a pivoting movement thereof about a pivot axle, namely in a direction counter to the aforementioned pivoting direction. This in turn causes the sensing element of the 2/2-way valve to bear against the cam plate, and the 2/2-way valve is displaced relative thereto with regard to its position. This takes place in such a way that a fluidic connection is established between the gas spring and a vent, so that compressed gas can escape from the gas spring, which brings about a lowering of the seat frame with respect to the base frame.

The activation of the weight adjustment of the vehicle seat or driver's seat may take place by either pulling or pushing the actuation element. In doing so, both the microswitch and the 2/2-way valve are adjusted by means of the cable and are held in the corresponding position by means of a locking lever until, once the static central position of the seat frame with respect to the base frame has been reached, the locking lever is pushed out of an opening of the carrier member by means of the unlocking element provided on the belt reel-in device and is thus released. In the released position of the locking lever, it is possible for a spring element which is provided to displace the control device comprising the 2/2-way valve and the microswitch into a passive operating position.

Both upon actuation of the control device to raise the seat frame and upon actuation of the control device to lower the seat frame, the 3/2-way valve is actuated. As a result, upon each actuation of the actuation element, the fluidic connection is established by the 3/2-way valve between the compressor and the belt reel-in device or the coupling provided on the belt reel-in device, and the coupling is acted upon by compressed gas from the compressor.

In embodiments of the aforementioned type which have long been known, the valves and the microswitch are typically arranged relatively close to the components or remaining components of the level regulation system or level control system or weight-dependent height regulation system. In the embodiments of the known type, said components and/or said valves and/or said microswitch are integrated in the seat in such a way that it is relatively difficult to gain access thereto from outside. However, in order to allow manual actuation, in embodiments of the known type a manually operated actuation element is then arranged at an easily accessible location and is actively connected to said components and/or valves or the switch via lines or Bowden cables in such a way that actuation of the valves and/or the switch from a distance is possible.

The object of the invention is to configure an adjustable vehicle seat in such a way that functionally reliable actuation is possible in a simple manner and using structurally simple means.

According to the invention, there is proposed in particular a vehicle seat according to claim 1 or according to claim 8 or according to claim 9. Preferred further developments form the subject matter of the dependent claims.

According to the invention, therefore, there is proposed a vehicle seat which comprises a base frame and a seat frame which can be adjusted or moved relative to this base frame. It is provided here that at least one gas spring acts between this base frame and this seat frame. This may be for example in such a way that the gas spring is coupled to the base frame and to the seat frame. However, it may also be provided for example that the gas spring is coupled to the seat frame and to a vehicle floor of a vehicle in which the vehicle seat may be arranged, wherein the base frame is likewise fixed relative to this vehicle floor. In one particularly advantageous embodiment, the base frame is coupled to the seat frame via a scissors-type framework. Such a scissors-type framework may in particular be formed of one, two or more pairs of cross-members, wherein each cross-member of each pair of cross-members is coupled to the associated cross-member of the same pair of cross-members at a point located between the ends thereof. For example, it may be provided that the respectively associated cross-members of a pair of cross-members are attached to one another in an articulated manner substantially in the centre or close to their centre. Particularly in such an embodiment comprising a scissors-type framework, it may also be provided that the aforementioned gas spring is arranged between the seat frame and a cross-member of the scissors-type framework or between the base frame or a vehicle floor on the one hand and a cross-member of the scissors-type framework on the other hand. Furthermore, at least one pressure source is provided which may be formed for example of a compressor. In addition, at least one valve device is provided which is in fluid connection with this at least one pressure source. The fluid connection here may be such that it is permanently provided to the pressure source, namely for example in the form of a line which is free of any further valves. However, it may also be provided that further valves or the like are provided in this fluid connection, which means that the fluid connection can be interrupted. Furthermore, a manually operated actuation element is provided for adjusting the vehicle seat. In one advantageous embodiment, this manually operated actuation element is arranged in a pivotable manner. The manually operated actuation element may be for example a button or a pivoting lever or a rotary knob.

It is provided that the at least one valve device is arranged on or in the actuation element.

It may be provided for example that two valves are provided. By way of example, it may be provided that one 2/2-way valve 12 is provided and one 3/2-way valve 14 is provided. In such en embodiment, it may be provided for example that these two valves, i.e. this 2/2-way valve and this 3/2-way valve, are provided on or in the actuation element.

It is provided in particular that a seat height adjustment device 80 is provided, by means of which the seat frame can be displaced relative to the base frame in order to adjust the seat height. This seat height adjustment device can be adjusted in particular manually, namely in particular through manual operation of the aforementioned actuation element. Furthermore, it is provided in particular that a device is provided for adjusting the gas pressure in the gas spring as a function of the weight of a person sitting on the vehicle seat. Such an adjustment device may in particular be such that the seat position—defined in particular for a vibration-free rest position—can be set as a function of the driver's weight in such a way that the seat height for different drivers' weights is in each case substantially the same and/or a predefined (minimum) negative residual spring travel remains.

It may be provided that this device is designed to adjust the gas pressure in the gas spring as a function of the driver's weight—this device also being referred to as a weight control system or level control system—automatically, that is to say that an adaptation to a changed driver's weight is carried out automatically without requiring any special manual actuation. It may also be provided—as an alternative or in addition—that the pressure in the gas spring according to the driver's weight can be adapted or adjusted accordingly to a changed driver's weight through manual initiation, or the seat is brought to a predefined height and/or is adjusted in such a way that a predefined minimum (negative) residual spring travel remains.

In one embodiment that is to be given particular preference, it is provided that a microswitch is provided. Furthermore, a belt reel-in device may be provided, which is for example the same as that disclosed in DE 40 25 183 C1. Reference is made in particular to the function and design of the belt reel-in device mentioned therein, and this reference is incorporated in the disclosure relating to the subject matter of the present disclosure, with the corresponding embodiments forming preferred embodiments of the present invention. However, it should be noted that the Bowden cables or lines which are disclosed in DE 40 25 183 C1 need not be provided according to the present invention, since the present invention makes it possible to accommodate the valve(s), in particular the 2/2-way valve and the 3/2-way valve, and/or microswitch on or in the actuation element.

In one advantageous embodiment, it is furthermore provided that the belt reel-in device is arranged on the seat frame. It may also be provided that the belt reel-in device has a coupling. It may be provided that the belt reel-in device comprises a belt which is fixed at one end to the belt reel-in device and at the other end to the base frame. It may furthermore be provided that a 3/2-way valve or the aforementioned 3/2-way valve is provided in order to actuate the coupling of the belt reel-in device which is preferably provided, namely in particular by means of compressed gas from the compressor or pressure source.

A motor may also be provided, which is provided in order to drive a compressor or the compressor provided in one advantageous embodiment. The compressor may be connected to the interior of the gas spring via appropriate fluid connections, such as hydraulic lines.

In one advantageous embodiment, it is provided that the 2/2-way valve and the 3/2-way valve are fluidically connected to the preferably provided compressor and/or gas spring.

In one particularly advantageous embodiment, it is provided that the height adjustment device is designed in such a way that the microswitch 24 is actuated, and namely in particular is closed, by actuating, in particular pulling up, the actuation element 10 (FIG. 5) in order to raise the seat or seat frame, wherein in this position or in the closed position of the microswitch 24 the drive motor is supplied with current and drives the compressor or the pressure source in such a way that the gas spring is acted upon by compressed gas.

In one particularly preferred embodiment, the height adjustment device is furthermore designed in such a way that, in order to lower the vehicle seat or the seat frame, the actuation element can be actuated or can be pushed downwards in such a way that the 2/2-way valve is brought into a position in which the gas spring is connected to a vent or is vented, so that compressed gas can escape therefrom and causes a lowering of the seat frame.

It may be provided that a cam plate is provided in the actuation element for actuating the 2/2-way valve or the microswitch—and optionally the 3/2-way valve—and is pivoted with the actuation element or is arranged in a fixed position, wherein, with a pivoting of the actuation element, the valve(s) and/or the microswitch are pivoted in such a way that they are actuated accordingly via a fixedly arranged cam plate.

It may be provided that the actuation element can be switched in multiple stages. The actuation element may in particular be arranged in a pivotable manner. Specifically in the case of such a pivotable arrangement, it may be provided that the actuation element is formed with multiple stages. By way of example, starting from a neutral position, the actuation element may be pivoted in two stages in the clockwise direction and pivoted in two stages in the anti-clockwise direction. In this case, it may be provided for example that the stages located closest to the neutral position in the two opposite directions of rotation are provided for height adjustment purposes, and the two further stages remote from the neutral position in both directions of rotation are provided for carrying out an adaptation to the driver's weight or for ensuring a predefined (minimum) (negative) residual spring travel.

It may also be provided that, when the vehicle seat is again loaded and/or when the ignition of a vehicle in which the seat is arranged is switched on, an adaptation of the seat or the seat height or the pressure in the gas spring takes place automatically as a function of the driver's weight and/or a predefined (minimum) (negative) residual spring travel is ensured, wherein additionally also the aforementioned manual adjustment possibility may be provided. When the term "driver's weight" is used, this of course should be understood to mean the weight of the person sitting on the seat, who—if the seat is a vehicle seat other than the driver's seat, such as the passenger seat, may of course be a person other than the driver.

In one particularly preferred embodiment, it is provided that a device is provided which automatically ensures that the seat height is set in such a way that in each case a predefined (negative) residual spring travel is allowed. This may be such that a predefined adjustment range is provided for the seat height, and then, once the seat height is set in such a way that it is at the limit of this adjustment range, there is still a predefined spring travel upwards and downwards. In other words, it may be provided that limit regions of the maximum adjustment range for the seat height cannot be actuated in such a way that the seat can remain there in a rest position, but rather that it is provided that the seat in this limit region can be moved only in a vibrating manner and the seat height adjustment is designed in such a way that the positions provided there in the limit region cannot be actuated.

It may for example be provided that a negative residual spring travel of 50 mm or 60 mm is provided, but depending on the embodiment other sizes may also be provided as the negative residual spring travel, such as for example a size of between 10 mm and 100 mm. This may in particular be such that the adjustable seat height or the adjustable height of the seat frame or the adjustment range for the seat frame is defined by a lowermost static seat frame position and an uppermost static seat frame position. The negative spring travel is then provided such that it is on the one hand above the uppermost seat frame position and on the other hand below the lowermost seat frame position.

It may be provided that the negative spring travel above the uppermost (static) seat frame position and below the lowermost (static) seat frame position is the same, or that different negative residual spring travels are provided.

In order to ensure that this negative residual spring travel is provided there, it may for example be provided that a travelling stop is provided. Such a travelling stop may be provided for example on the belt or on the belt reel-in device.

In one advantageous embodiment, it is provided that the spring travel is for example 100 mm or 120 mm or a value lying therebetween, and in the end positions is limited to 50 mm or is in each case 50 mm.

It may be provided that a seat height adjustment or height adjustment of 50 mm to 200 mm, preferably 70 to 120 mm, preferably essentially 80 mm is possible.

In one embodiment which is to be given particular preference, it is provided that basic components, such as carrier, belt etc. are retained compared with the previously known embodiment, in particular the previously known embodiment mentioned in the introduction.

At least advantageous embodiments of the invention allow reliable installation in process terms and eliminate the need for adjustment works. Furthermore, supplier modules may be worthy of testing, at least in advantageous embodiments. The number of components can also be reduced. In one advantageous embodiment, the valve functions are integrated in housing parts. This means in particular that the function of the 2/2-way valve and/or of the 3/2-way valve is integrated in housing parts. In particular, it may be provided that one housing part is arranged on the actuation element.

It may also be provided that a control possibility via the armrest or MFAL or a vehicle dashboard is made possible. It may be provided that the control element is provided on the driver's seat or vehicle seat, or—as mentioned above for example—on the dashboard or on an armrest of the vehicle seat for example. It should be noted that it may be provided that the negative spring travel is limited, for example is limited to 50 mm, by a travelling stop which is moved by a reel-in belt. This prevents an excessive (upward) excursion of the suspension system, which could lead to uncertainties in controlling the vehicle (e.g. braking process, driving downhill, etc.).

In addition, it may be provided that the maximum available suspension comfort is always provided automatically via the function of ensuring the negative residual spring travel.

The aforementioned device for adjustment as a function of the driver's weight (level regulation system) may in particular also be such that it is not a predefined position that is assumed, but rather it is ensured that a negative residual spring travel always remains. It may be provided in this case that the activation of the residual spring travel check (weight adjustment) takes place by briefly actuating the two-stage handle in the upward or downward direction as far as stage 1. "Stage 1" preferably corresponds to half the (maximum excursion) travel on the handle.

It was mentioned above that the height adjustment may be provided in stage 1. However, in an alternative embodiment, it may also be provided that the aforementioned height adjustment of the vehicle seat or driver's seat or seat frame is provided in stage 2, and the activation of the residual spring travel check may be provided in stage 1, as mentioned above.

It may be provided that, after the actuation element or handle in stage 1 has been actuated by pushing (downwards) or pulling (upwards), the control system engages and is locked and activates either the function "air in" or "air out" in the event of deviations of the residual spring travel. It may be provided that, in the case of too small a negative residual spring travel, air is conveyed out of the system via a 2/2-way valve or the 2/2-way valve, so that the suspension is lowered. It may furthermore be provided that, in the case of too large a residual spring travel, the compressor is activated via a switch or closing member, so that the suspension is raised. This switch is in particular the aforementioned microswitch, which in particular is also integrated in the handle or the actuation element or is arranged thereon. It should be noted that the actuation element may in particular be a handle. It may be provided that, once the nominal value for the negative residual spring travel has been reached, such as for example 50 mm or another value, the control system is deactivated via a switch cam, that is to say that the locking of the control system is released and the latter is reset to the starting position via a tension spring.

It may furthermore be provided that the height adjustment of the suspension takes place by actuating and holding the actuation element or handle in a switching or locking stage 2 of the actuation element. It may be provided here that the control system is brought into an engaged position, and depending on the selected direction either the compressor (upwards) or the 2/2-way exhaust air valve (downwards) is also activated.

It may be provided that, in parallel with this, a 3/2-way valve is actuated, which opens a coupling for the travelling stop for as long as the handle or actuation element is operated in stage 2.

It may be provided that, after the end of the height adjustment, the belt reel-in device is immediately reconnected and this position is set as the new position for the negative residual spring travel, which is for example 50 mm or a value between 30 and 80 mm. It may be provided that, in the case where the positive residual spring travel of for example likewise 50 mm or a value between 30 and 80 mm is not reached during height adjustment in the downward direction, this is corrected automatically after the end of the height adjustment.

It may be provided that the positive residual spring travel in the case of height adjustment in the downward direction is likewise 50 mm or a value between 30 and 80 mm, wherein this is increased accordingly by the value of the height adjustment in the case of height adjustment in the upward direction.

In one advantageous embodiment, it is provided that an absolutely still sitting position is advantageous or necessary during the level-setting operation in order to ensure the exact residual spring travel.

Figure 1:
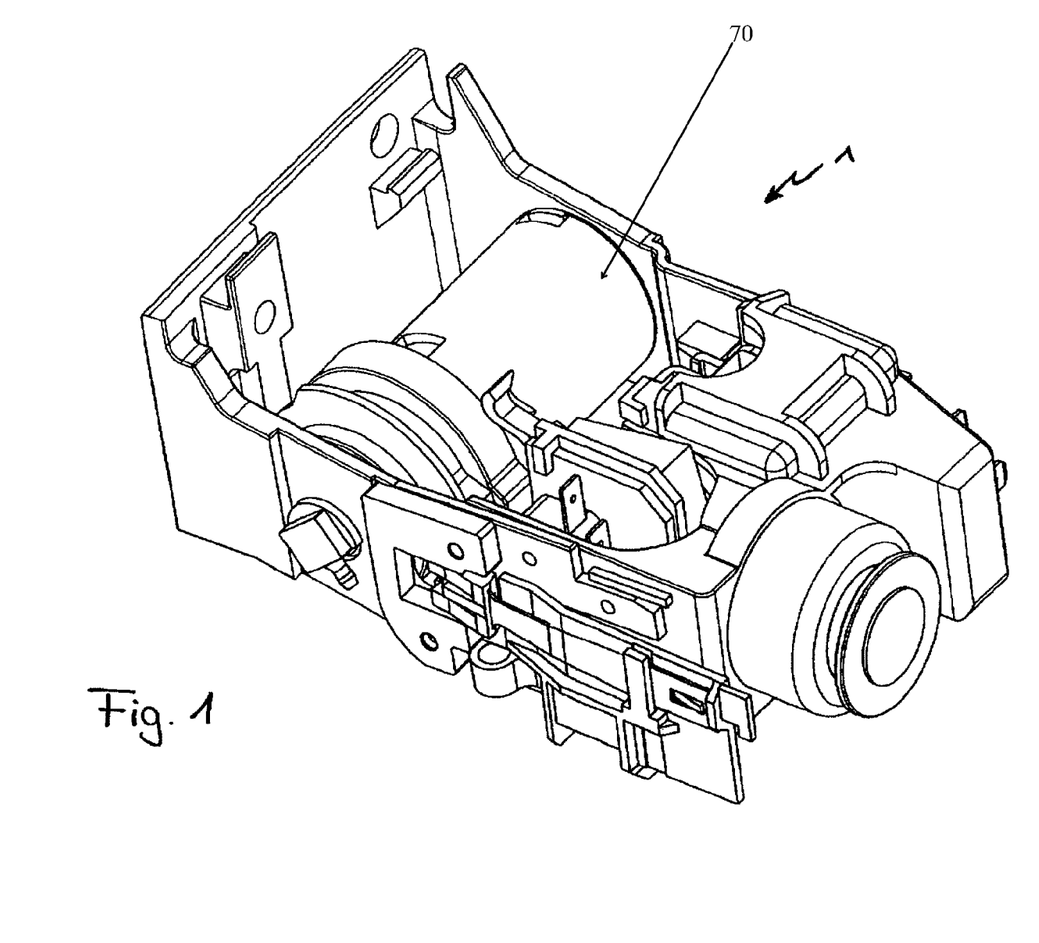
Figure 2:
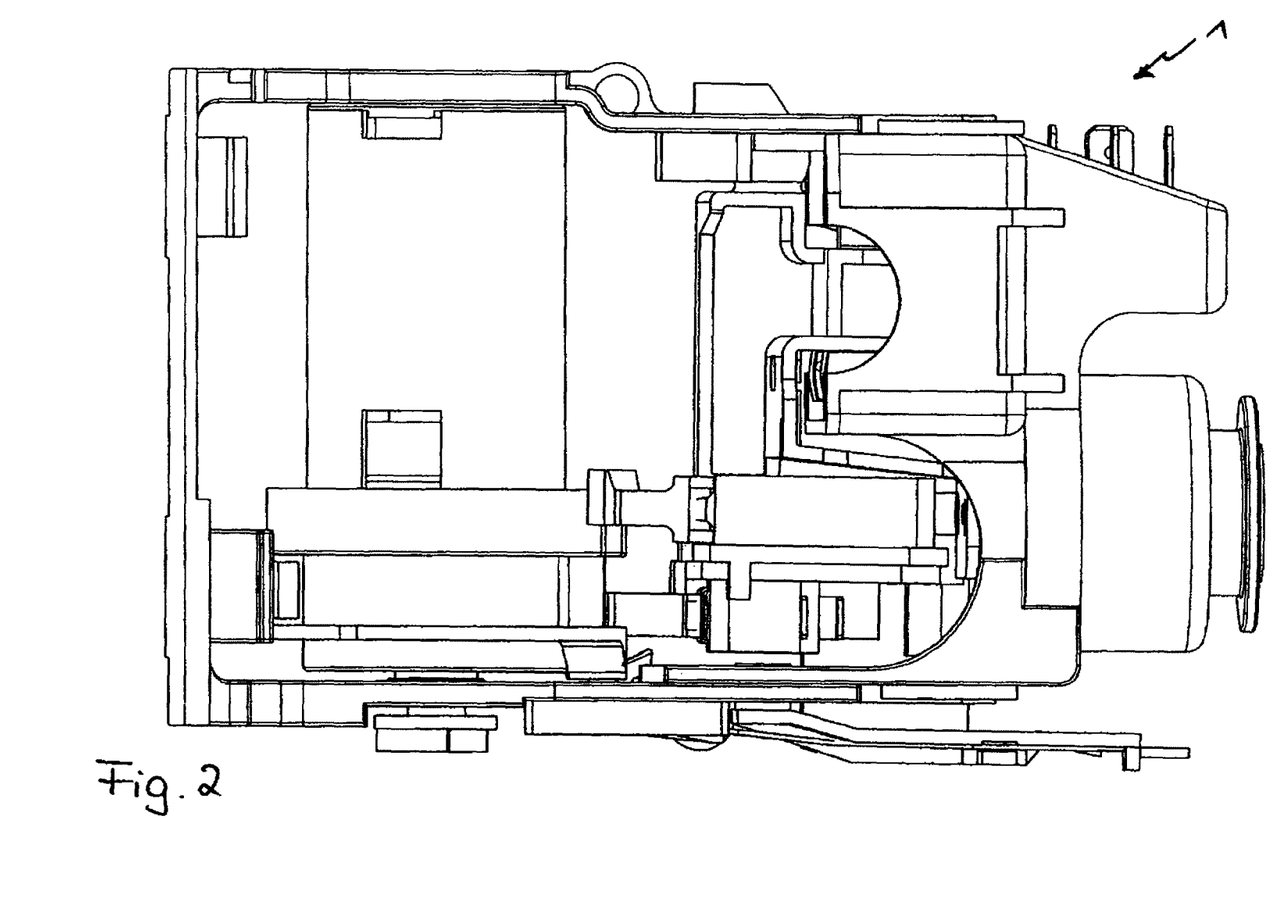
Figure 3:
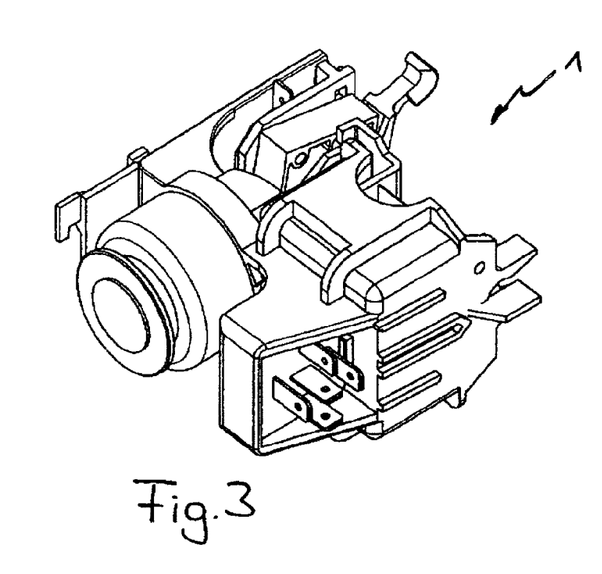
Figure 4:
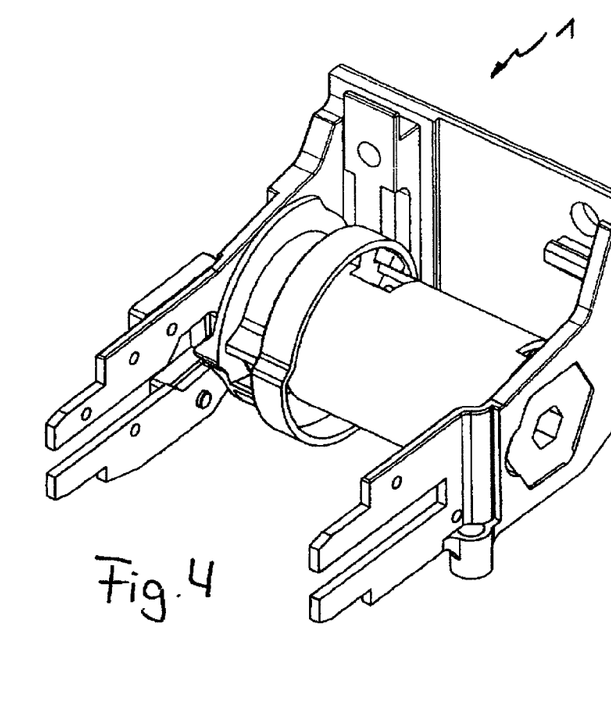
Figures 5, 6:
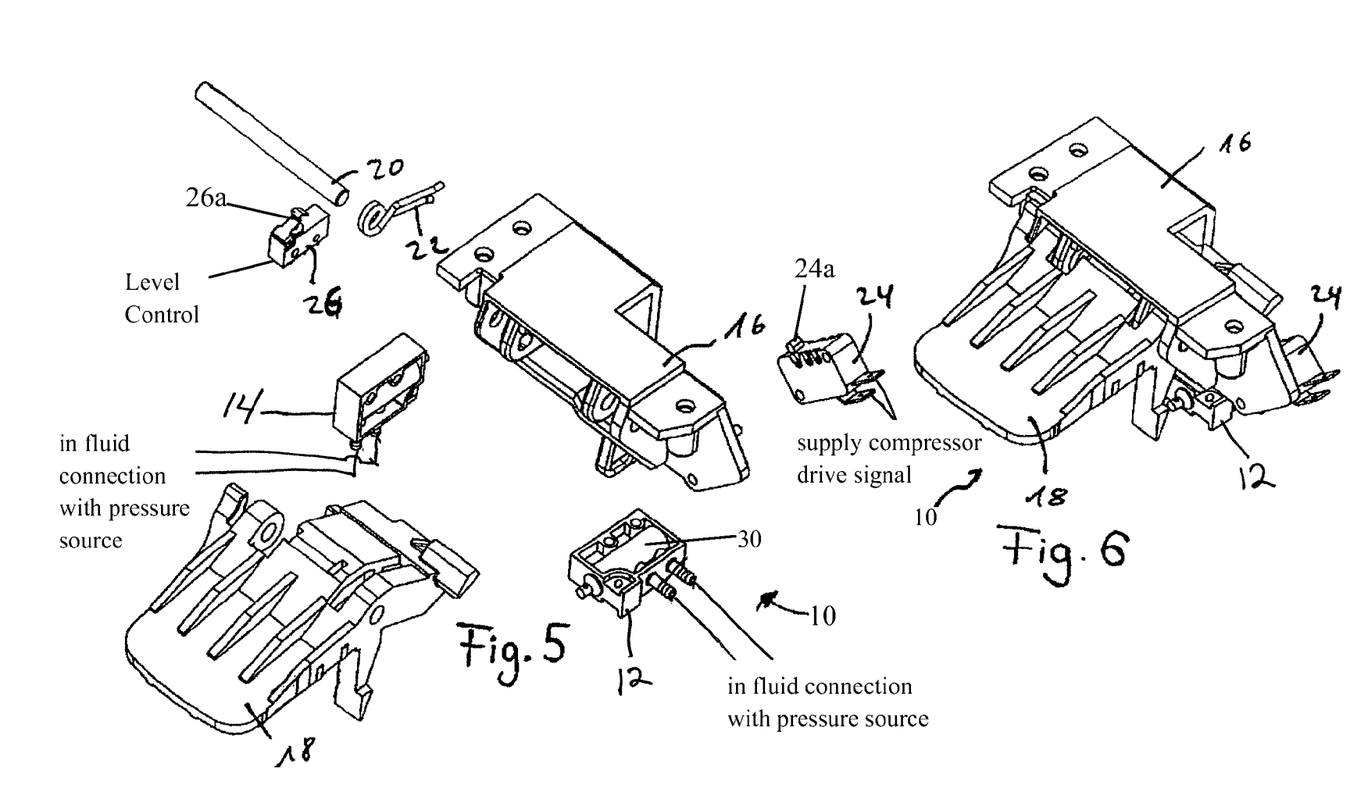
Figure 8:
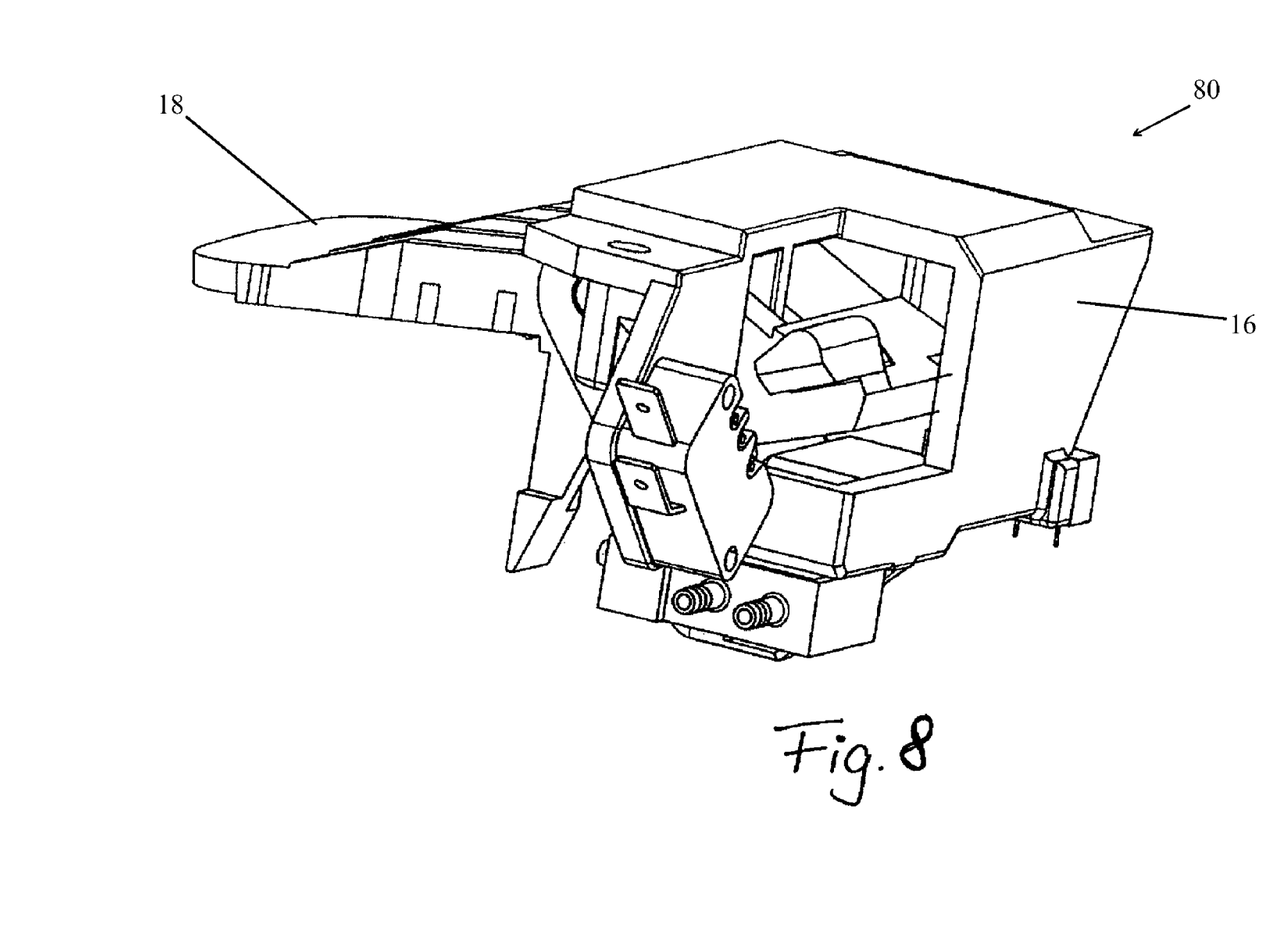
Figure 9:
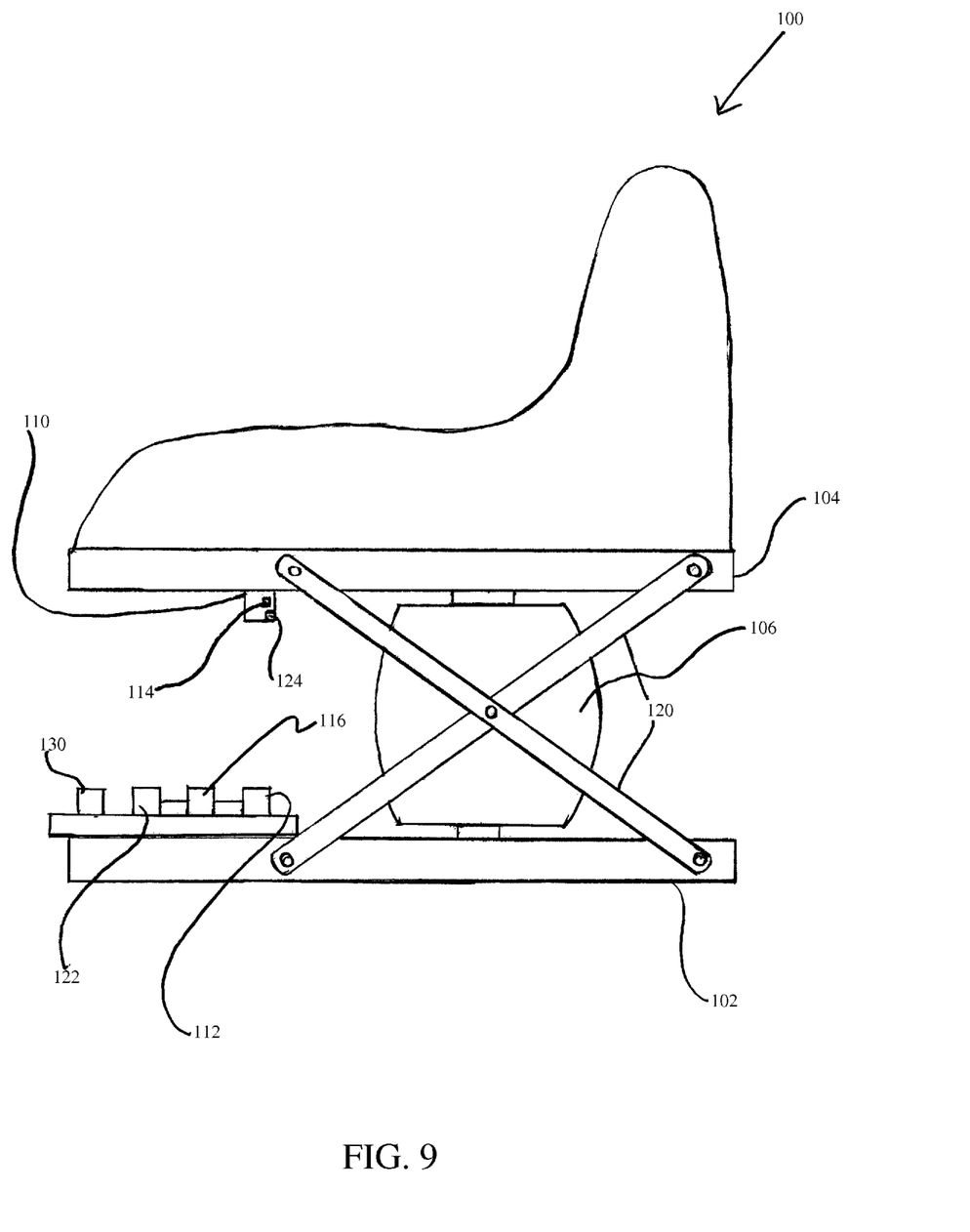

In one particularly advantageous embodiment, it is provided that the connections or connecting lines from the actuating element or handle or button to the control system are formed by one or more cables and/or by hoses. It may be provided that the push-in function is of magnetic design, or that the 2/2-way valve and/or the 3/2-way valve is in each case a solenoid valve 30 (FIG. 5). It is provided in particular that the valves and switches for height adjustment are integrated in the handle or in the button or in the actuation element 10.

Unlike in previously known embodiments, in particular no rocker function is provided in the control system for height adjustment. It may be provided that no adjustment works are necessary.

In one particularly advantageous embodiment, it is provided that a level adjustment or weight adjustment is carried out each time the vehicle is started. For this purpose, a corresponding coupling to the ignition may be provided, so that a corresponding level adjustment or weight adjustment is brought about automatically by "Ignition on" or "Ignition off".

The vehicle seat is thus preferably designed in such a way that it has a signal connection interface, via which a signal connection can be produced by the state and/or change in state of the ignition, wherein, in the event of a switch from "Ignition off" to "Ignition on", a signal indicates via this interface the "off/on" change in state. It may be provided here that a level adjustment or weight adjustment is triggered automatically by this signal.

It may also be provided that, in the event of a restart of the suspension via a tilting function, in particular in a stage 1 of the actuation element or handle or switch or at an air pressure of 0 bar is possible or is carried out. The invention means that relatively few parts are required.

It may be provided that the magnet of the solenoid valve or solenoid valves is in each case suitable for a voltage of 12 to 48 Volt.

In one advantageous embodiment, it is provided that the magnet of the solenoid valve 30 is provided or designed with monoflop (control). Monoflop may also serve to reduce the development of heat in the magnet. The magnetic force at high temperatures can be greatly reduced, which can be taken into account when calculating. The switch-on time can also be reduced.

It may be provided that a monopulse is less than one second, and in particular in the case of "Ignition on" or in the case of handle actuation.

It may furthermore be provided that, after a break in power (e.g. after switching from "Ignition off" to "Ignition on"), the level control system is activated automatically. By way of example, it may be provided that a monopulse is generated after such a break in power in order to automatically activate the level control system.

In one particularly advantageous embodiment, it is provided that at the start of a journey the weight of the driver is checked and the residual spring travels in the suspension system are corrected automatically by a module—integrated in particular in the level control system—which outputs a pulse or stored energy when the vehicle is restarted (ignition "on") in order to activate the control system for a predefined duration, such as approx. 1 second for example. It is preferably provided that this pulse occurs after each break in power and/or break in the ignition. One advantage of such an embodiment lies in the fact that a weight check always takes place automatically, as a result of which the residual spring travels and the resulting maximum comfort of the vehicle seat or driver's seat is always ensured. It is provided in particular that a further manual adjustment possibility for height and weight is not restricted thereby.

In one advantageous embodiment, the actuation element comprises a handle which is designed in particular as a pivoting handle, and valve functions for a 3/2-way valve and a 2/2-way valve which are preferably arranged in particular in a common housing and are connected to the handle, in particular are connected thereto in a pivotable manner, a microswitch for the level control, an axle, a leg spring and a microswitch for "Compressor on", and optionally a reel-in device. It may in particular be provided that the actuation element is an actuation module.

It is provided in particular that the weight adjustment/level regulation takes place automatically when the vehicle is restarted after "Ignition on" by pushing in a level control unit. It may be provided that in doing so the negative residual spring travel value of 50 (or 60) mm is checked. It may be provided that the weight adjustment/level regulation likewise takes place automatically by moving the actuation handle or the actuation element as far as a first stage (pressure point), namely for example selectively upwards or downwards. Furthermore, it may be provided that the switching process here takes place in a negative manner, that is to say that the level control unit is not pivoted into its working position until after the actuation element or actuation handle has been reset to its central position.

It may also be provided that the magnet as actuator here is supplied with current only for a period of at most one second. This prevents excessive heating of the magnet.

It may also be provided that, in the event of any deviation of the negative residual spring travel from the nominal value, either the compressor (position too low) is activated via the microswitch or an exhaust air valve (position too high) is actuated.

In addition, it may be provided that, once the negative residual spring travel (upwards) of for example 50 or 60 mm has been reached, the control system is automatically deactivated. It may be provided that an absolutely still sitting position is required during the level-setting process in order to ensure the exact residual spring travels. It may also be provided that the level control unit is always deactivated if the zero crossing/level is passed.

It may be provided that the height adjustment, which may for example be within a range of 80 mm—although other values are also possible, such as for example those between 50 and 150 mm or even others—is carried out for example by continuously pulling (upwards) or pushing (downwards) via an actuation element or handle into a stage 2.

It may be provided here that, by actuating the handle or the actuation element in stage 2, the coupling in the belt reel-in device is released via a 3/2-way valve integrated in a handle housing and moreover the compressor is activated via a microswitch (handle upwards) and air is supplied in order to raise the suspension, or air is discharged via a 2/2-way valve (handle downwards) in order to lower the suspension.

In one embodiment which is to be given particular preference, it is provided that, once the desired height has been reached, immediately after releasing the handle or the actuation element, a coupling in the belt reel-in device is engaged and fixes this position as the new suspension height.

Furthermore, it may be provided that, at the same time as the function "height adjustment", the function "weight adjustment/level regulation" is always carried out, i.e. the negative residual spring travel is always checked subsequently after the end of the height adjustment process or after releasing the handle or the actuation element. However, it should also be noted that this is a preferred embodiment, which may of course also be different without departing from the invention.

It may be provided that an absolutely still sitting position is required during the level-setting process in order to ensure the exact residual spring travels.

Furthermore, it may be provided that the level control unit is always deactivated if the crossing/level is passed.

Examples of embodiments of the invention will be explained in more detail below with reference to the figures, although the invention is not intended to be limited by these. In the figures:

BRIEF DESCRIPTION OF THE DRAWINGS

FIG. 1 to FIG. 9 show examples of embodiments of the invention in a schematic view.

DETAILED DESCRIPTION OF THE INVENTION

The vehicle seat 1 (shown only partially in the figures) according to the invention comprises a base frame which is not shown and also a seat frame which is likewise not shown and which can be adjusted relative to the base frame. A gas spring acts between this base frame and this base frame and is supported against the seat frame. Also provided is a pressure source and a plurality of valve devices 12, 14 which are in fluid connection with this pressure source. The valve device 12 is a 2/2-way valve and the valve device 14 is a 3/2-way valve. The 2/2-way valve 12 and the 3/2-way valve 14 are in each case integrated in a valve housing 16. A handle 18 is also provided for actuating the height adjustment and the negative residual spring travel check, which handle is mounted in a pivotable manner by means of an axle 20, wherein a torsion spring 22 is held by this axle 20. Also provided is a microswitch 24 having an activation tab 24a for the function "Compressor on" and a microswitch 26 having an activation tab 26a for the level control. The aforementioned spring is in particular a leg spring.

It is provided in particular that the handle is set at an angle to the housing. The housing comprising the valves and the microswitches are consequently arranged on the handle or on the actuation element or are integrated in the actuation element.

All the features disclosed in the application documents are claimed as essential to the invention in so far as they are novel individually or in combination with respect to the prior art.

LIST OF REFERENCES

1 vehicle seat
12 2/2-way valve
14 3/2-way valve
16 valve housing
18 handle
20 axle
22 torsion spring
24 microswitch
26 microswitch A vehicle seat includes a base frame, a seat frame which can be adjusted relative to the base frame, a gas spring which acts between the base frame and the seat frame and which is supported against the seat frame, a manually operated actuation element for adjusting the vehicle seat, and at least one pressure source and at least one valve device which is in fluid connection with the pressure source, wherein the at least one valve device is arranged on or in the actuation element.

The vehicle seat further includes a seat height adjustment device for displacing the seat frame relative to the base frame in order to adjust the seat height. The vehicle seat further includes a gas adjustment device for adjusting the gas pressure in the gas spring as a function of the weight of a person sitting on the vehicle seat. The vehicle seat further includes a microswitch arranged on or in the actuation element. The valve device includes a 2/2-way valve and a 3/2-way valve. The manually operated actuation element is configurable to pivot about a pivot axle upon actuation.

The vehicle seat further includes a solenoid valve having a monoflop control system to protect against overheating.

The vehicle seat further includes an ignition interface for transmission of a signal indicating the change of state of the vehicle from "Ignition off" to "Ignition on," which signal triggers an automatic (weight) level regulation.

In another embodiment, the vehicle seat includes a base frame, an adjustable seat frame having a gas spring configured to act between the base frame and the seat frame, at least one pressure source, and a manually operated actuation element for adjusting the vehicle seat having at least one valve device in fluid connection with the pressure source.

The invention claimed is:

1. A vehicle seat device in fluid connection with a pressure source and in signal communication with a compressor, the device comprising:
   a housing;
   at least one switch attached to the housing, the at least one switch for supplying the compressor a drive signal and for controlling a level control system;
   at least one valve attached to the housing, the at least one valve device is in fluid connection with the pressure source; and
   a manually operated actuation element that rotates about an axle, wherein the manually operated actuation element makes direct contact with the at least one switch when the actuation element has been manually operated to a first position, thereby causing the at least one switch to generate an activate signal and send the activate signal to the compressor, and wherein the manually operated actuation element makes direct contact with the at least one valve when the actuation element has been manually operated to a second position, thereby causing the at least one valve to discharge air from the pressure source.

2. The vehicle seat of claim 1, wherein the at least one valve device comprises a 2/2-way valve and a 3/2-way valve.

3. The vehicle seat of claim 1, further comprising a pivot axle mounted in the housing, wherein the manually operated actuation element is configurable to pivot about the pivot axle upon actuation.

4. The vehicle seat of claim 1, wherein the at least one valve device comprises a solenoid valve having a magnet provided with monoflop control.

* * * * *